United States Patent [19]

Eisenberg

[11] 4,379,713
[45] Apr. 12, 1983

[54] METHOD AND APPARATUS FOR FORMING GLASS FIBERS

[75] Inventor: Arnold J. Eisenberg, Granville, Ohio

[73] Assignee: Owens-Corning Fiberglas Corporation, Toledo, Ohio

[21] Appl. No.: 331,446

[22] Filed: Dec. 16, 1981

[51] Int. Cl.³ .......................................... C03D 37/025
[52] U.S. Cl. .............................................. 65/1; 65/2; 65/374.12
[58] Field of Search ............................ 65/1, 2, 374.12

[56] References Cited

U.S. PATENT DOCUMENTS 3,979,195  9/1976  Strickland ................................. 65/1
4,088,467  5/1978  Shono et al. ............................. 65/2
4,159,198  6/1979  Wakasa et al. ........................... 65/1
4,328,015  5/1982  Melan et al. ............................. 65/2

Primary Examiner—Robert L. Lindsay, Jr.
Attorney, Agent, or Firm—Ronald C. Hudgens; Philip R. Cloutier; Greg Dziegielewski

[57] ABSTRACT

The invention disclosed herein relates to method and apparatus for forming glass fibers wherein a fiber forming feeder has a bottom wall comprised of a substrate and a control layer arranged to form reticulated indentations around the orifices therein to promote the movement of molten glass from a disrupted orifice to an adjoining orifice wherein attenuation is continuing.

12 Claims, 7 Drawing Figures

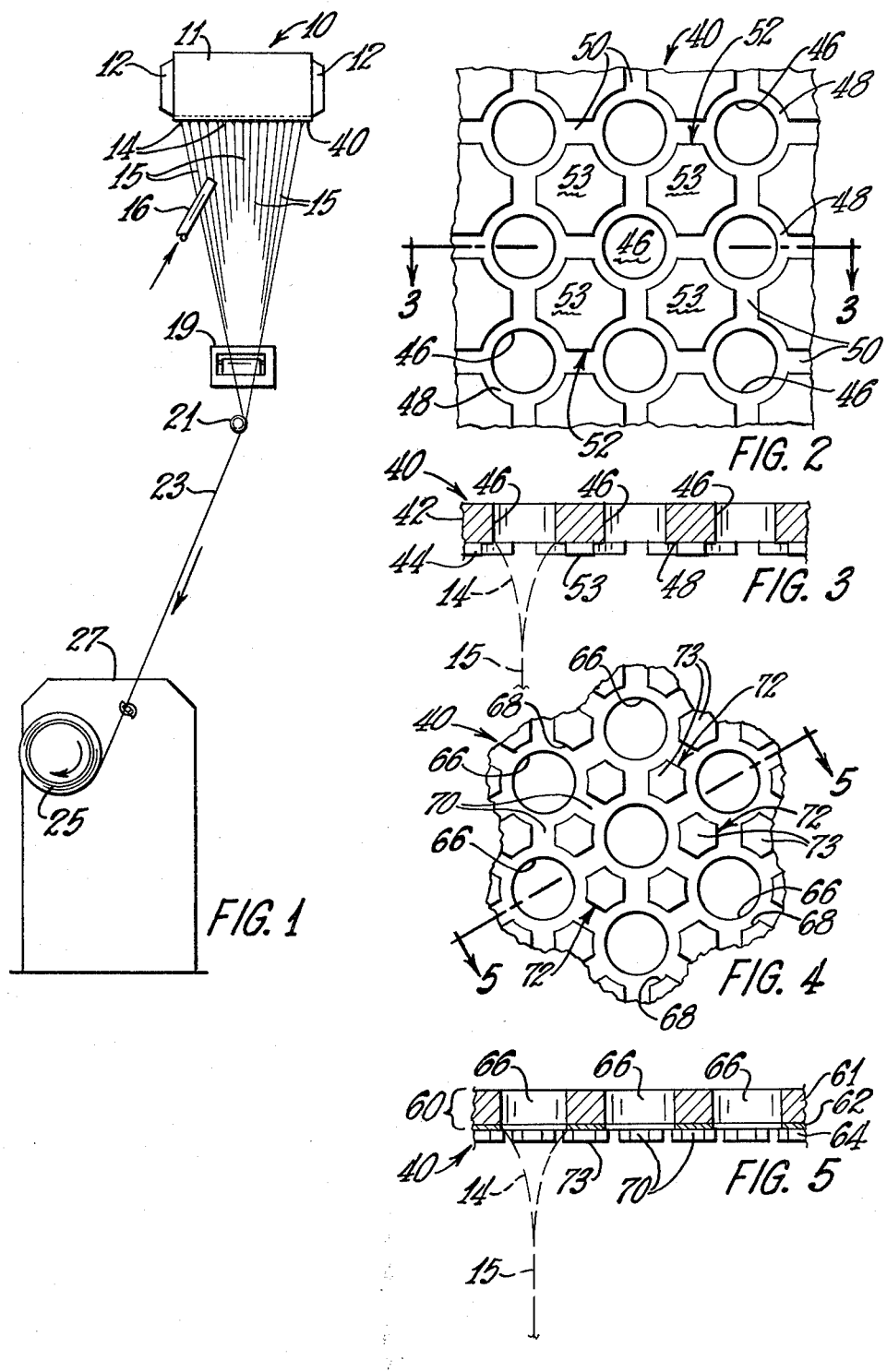

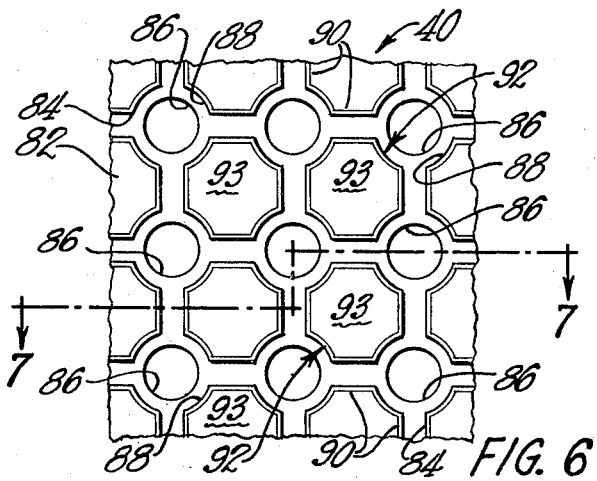
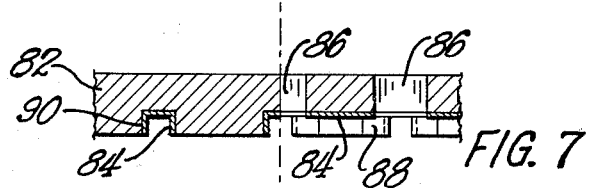
FIG. 6
FIG. 7

METHOD AND APPARATUS FOR FORMING GLASS FIBERS

TECHNICAL FIELD

The invention disclosed herein relates to method and apparatus for forming glass fibers wherein a fiber forming feeder has a bottom wall comprised of a substrate and a control layer arranged to form reticulated indentations around the orifices therein to promote the movement of molten glass from a disrupted orifice to an adjoining orifice wherein attenuation of the molten material into a filament is continuing.

BACKGROUND ART

The most widely employed technique for the production of continuous glass filaments consists essentially of drawing the filaments from a feeder or bushing having a base plate provided with a plurality of nozzles or projections, each of the projections having an orifice adapted to permit the molten glass to flow therethrough to provide a stream of molten material in a fiberizable condition. Such projections are otherwise known as "tips".

Such "tip" type bushings substantially reduce the phenomenon of "flooding" of the bushing bottom wall upon a disruption of a filament forming operation, known as a "breakout".

Flooding, the process wherein molten glass emerging from the bushing bottom wall generally spreads over the lower face of the bottom wall, is an acute problem with "tipless" bushings. That is, flooding is a particularly significant problem for bushings having a bottom wall comprised of a generally smooth or flat perforated plate with the streams of molten glass flowing from the orifices through the plate.

The flooding problems associated with such tipless bushings account for the fact that such bushings are not widely employed. The present invention provides a system wherein the phenomen of flooding and the problems associated therewith can be substantially reduced.

DISCLOSURE OF THE INVENTION

The present invention pertains to method and apparatus for producing continuous filaments or inorganic material wherein the feeder for supplying the streams of molten material to the attenuated into filaments is comprised of an orifice wall comprising a substrate having a plurality of orifices therethrough adapted to issue streams, and a control layer joined to said substrate, said substrate and control layer being arranged to form reticulated indentations around the orifices wherein at least a portion of recesses are comprised of a material characterized in that said molten material exhibits a greater tendency to move through the reticulated indentations than over an exterior surface of the wall surrounding the orifices.

BRIEF DESCRIPTION OF THE DRAWINGS

FIG. 1 is a semi-schematic elevational view of a textile glass fiber-forming system.

FIG. 2 is an upwardly directed plan view of a portion of the bottom wall of the feeder shown in FIG. 1.

FIG. 3 is a cross-sectional view taken along view 3—3 of the wall shown in FIG. 2.

FIG. 4 is an upwardly directed plan view of a portion of the bottom wall of a fiber-forming feeder similar to that shown in FIG. 1.

FIG. 5 is a cross-sectional view of the portion of the wall shown in FIG. 4 taken along view 5—5.

FIG. 6 is an upwardly directed plan view of a portion of a bottom wall of a fiber-forming feeder similar to that shown in FIG. 1.

FIG. 7 is a cross-sectional view of the wall shown in FIG. 6 taken along view 7—7.

BEST MODE OF CARRYING OUT THE INVENTION

As shown in FIG. 1, feeder or bushing 10 is adapted to supply a plurality of streams 14 of inorganic material, such as glass, to be attenuated into continuous filaments 15 through the action of winder 27. Filaments 15 receive a liquid size or coating at applicator 19 and are gathered into strand 23 at gathering shoe 21, as is known in the art. Strand 23 is then wound into a package 25 at winder 27, as is known in the art. Environmental control means or blower 16 is adapted to supply a stream or streams of cooling fluid, such as air, toward streams 14 and bottom wall 40 to remove heat from the fiber-forming zone to facilitate attenuation of the streams into filaments.

Feeder 10 is comprised of housing or upper walls 11 suitably joined to bottom wall 40 having terminals 12 associated therewith to electrically energize bottom wall and/or housing 11 to heat the molten material therein. As such, terminals 12 are adapted to be connected to a suitable source of electrical power (not shown).

As shown in FIGS. 2 and 3, bottom wall 40 is comprised of a substrate 42 and a control layer 44, with substrate 42 having a plurality of orifices 46 extending therethrough adapted to issue streams of molten material 14 therefrom to be attenuated into filaments 15.

Portions of substrate 42 form the base of recess or seat 48 around each orifice 46 and a channel or groove 50 extending between and in communication with the adjoining recesses 48. Such recesses 48 and channels 50 form reticulated indentions around the orifices wherein at least a portion of the recesses are comprised of or lined with a material characterized in that the molten material exhibits a greater tendency to move through the reticulated indentations than over the exterior surfaces 53 of landings or bosses 52 of bottom wall 40.

As can be seen in the drawings, the bottom edge of orifices 46 meet the bottom surface of recess 48. The outwardly extending sidewalls of the recesses 48 and channels 50 are defined by control layer 44, and the bottom section of recesses 48 and channels 50 are defined by the exterior surface or surface of substrate 42. As such, the material of substrate 42 should exhibit a greater tendency for the molten material to "wet" the surface thereof than the material of control layer 44. That is, the material substrate 42 should exhibit a smaller wetting contact angle when associated with a bead of molten material than the wetting contact angle of the material of control layer 44 when associated with a bead of such molten material.

As is known in the art, such "wetting contact angles" are determined by the angle formed between the surface of a given composition and a bead of molten material of a given composition when in contact with each other.

Any suitable materials exhibiting such characteristics with respect to the response of the molten material may be suitable. For example, substrate 42 can be comprised of substantially pure platinum and control layer 44 can be comprised of rhodium. Also, substrate 42 and/or control layer 44 can be platinum-rhodium alloys if the rhodium content of the control layer 44 is greater than the rhodium content of such a substrate 42. As such, the molten material will exhibit a greater tendency to move through recesses 48 and channels 50 rather than across exterior surface 53 of control layer 44, since the molten glass will have a greater tendency to wet the recesses 48 and channels 50.

Landings or bosses 52 having exterior surfaces 53 thereon are positioned among recesses 48 and channels 50.

Bottom wall 40 may be fabricated by bonding control layer 44 to substrate 42 by any suitable means, such as electrodeposition or hot isostatic pressing. Orifices 46 may be formed therein by any suitable means and recesses 48 and channels 50 may be formed in control layer 44 such that the surface of substrate 42 is exposed at the bottom section thereof by any suitable means such as selective etching and/or machining.

In operation, if a filament 15 breaks out, the molten material flowing through the disrupted orifice 46 should exhibit a tendency to flow through recess 48 and channels 50 associated therewith to one or more of the surrounding orifices and streams in the absence of spreading over the exterior surface of bottom wall 40 in a random manner disrupting the entire fiber forming operation. With the controlled distribution of the glass from a disrupted orifice to orifices and streams still being attenuated, the fiber forming operation should proceed unabated.

For the majority of fiber forming operations, the diameter of the orifices 46 may be within the range from about 0.030 inch to about 0.090 inch or as is known in the art. The diameter of the counterbores forming recesses 48 may be within the range from about 110% to about 200% of the orifice diameter. Further, the cross-sectional area of a channel 50 may be within the range from about 4% to about 25% of the cross-sectional area of an individual orifice 46. Further, it may be advantageous to use an arrangement wherein the chanenls 50 are formed deeper into the substrate 42 than the recesses 48.

As such, bottom wall 40 has an exterior surface that is generally planar or without "tips" or projections extending downwardly from bottom wall 40, as is generally known in the art.

As shown in FIGS. 4 and 5, bottom wall 40 is comprised of a substrate 60 and a control layer 64, wherein the substrate 60 is comprised of a laminate of first layer 61 and second layer 62. As such, first layer 61 can be a platinum alloy containing rhodium, for example J Alloy, which contains approximately 25% rhodium and the remainder platinum. Second layer 62, which is intimately bonded to first layer 61, may be comprised of substantially pure platinum or a platinum-rhodium alloy having a lower rhodium content than the rhodium or platinum-rhodium alloy material of control layer 64.

Similarly, orifices 66 extend through substrate 60 and recesses or seats 68 individually surround each orifice 66, and channels or grooves 70 extend between and in communication with recesses 68.

The orifices 46 in FIG. 2 are arranged in a rectangular array, whereas the orifices 66 of FIG. 4 are arranged in a staggered array. As such, each orifice 66 within the field of orifices is in communication with six adjacent orifices by means of the reticulated indentations therein.

The three layered system as shown in FIGS. 4 and 5 may be laminated by any suitable means, such as by hot isostatically pressing three sheets of suitable material together to intimately bond them together. Seats 68 and groove 70 may be formed in control layer 64 and second layer 62 by any suitable means such as chemical etching or milling.

As shown in FIG. 5, the bottom sections of recesses or seats 68 are defined by a surface of second layer 62 and the vertical walls of seat 68 and channels 70 are defined by surfaces of control layer 64. As such, landings or heads 72 having exterior surfaces 73 are located among orifices 66.

Thus, first layer 61 of substrate 60 may contain any desired amount of rhodium notwithstanding the amount of rhodium employed in control layer 64, since second layer 62 is chosen to have suitable wetting characteristics with respect to control layer 64. That is, the wetting contact angle of the material of second layer 62 should be less than the wetting contact angle of the material of control layer 64 to reduce the tendency of the bushing bottom wall to flood in the event of filament breakouts during attenuation. As such, exterior surfaces 73 exhibit a tendency to be more non-wetting or less wetting than at least a portion of recesses 68 and channels 70.

As shown in FIGS. 6 and 7, bottom wall 40 is comprised of substrate 82 and control layer 84 having a plurality of orifices 86 extending therethough adapted to issue streams molten material for attenuation into filaments. Recesses or seats 88 and channels or grooves 90 are formed in substrate 82 by any suitable means to form a network of indentations associated with orifices 86. Landings or bosses 92 having exterior surfaces 93 are formed among orifices 86.

However, only recesses 88 and channels 90 are lined with control layer 84. Opposite from the technique employed in FIGS. 2-5, the material of control layer 84 should exhibit a greater tendency to be wet by the molten material than the substrate 82, which is exposed as exterior surfaces 93 among recesses 88 and channels 90. Similarly, however, the molten material from a disrupted orifice should exhibit a greater tendency to move through recesses 88 and channels 90 to adjoining undisrupted streams surrounding the disrupted orifice to permit continuous operation of the fiber forming system. In essence, the molten glass should exhibit a greater affinity for the material of the recesses and grooves than for the exterior surfaces of the landings.

Even though the recesses and seats disclosed herein are shown as being circular in nature and the channels or grooves disclosed herein are shown to be substantially rectangular in shape, it is to be understood that any suitable shapes of such recesses and/or channels may be employed.

Control layer 84 may be formed along recesses 88 and channels 90 by any suitable means, preferably with control layer 84 being securely joined or intimately bonded to substrate 82 to prevent unwanted delamination of the system.

It is apparent that within the scope of the present invention, modifications and different arrangements can be made other than as herein disclosed. The present disclosure is merely illustrative, with the invention comprehending all variations thereof.

INDUSTRIAL APPLICABILITY

The invention disclosed herein is readily applicable to the formation of continuous and/or discontinuous glass filaments.

I claim:

1. A method of forming glass filaments comprising:
providing a feeder having an orificed wall having a substrate having a plurality of orifices therethrough adapted to issue attenuable streams of molten glass, said substrate and molten material exhibiting a first contact wetting angle; and a control layer joined to said substrate to form a recess around the individual orifices having a network of channels interconnecting said recesses, said channels being adapted to permit said molten glass to move therethrough from one recess to another recess at predetermined times, said channels and recesses having at least a portion of the surface defining said channels and recesses comprised of said substrate, said control layer and said molten glass exhibiting a second contact wetting angle therebetween, the first contact wetting angle being less than the second contact wetting angle such that the molten glass has tendency to prefer to move through said channels from an orifice having a filament attenuation disruption to a non-disrupted orifice;
issuing streams of molten glass from said orificed wall;
and attenuating the streams into filaments.

2. An orificed wall for a feeder for supplying streams of molten glass material to be attenuated into filaments comprising:
a substrate having a plurality of orifices therethrough adapted to issue said streams, said substrate and molten material exhibiting a first contact wetting angle therebetween; and
a control layer joined to said substrate to form a recess around the individual orifices having a network of channels interconnecting said recesses, said channels being adapted to permit said molten material to move therethrough from one recess to another recess at predetermined times, said channels and recesses having at least a portion of the surface defining said channels and recesses comprised of said substrate, said control layer and said molten material exhibiting a second contact wetting angle therebetween, the first contact wetting angle being less than the second contact wetting angle such that the molten material has tendency to prefer to move through said channels from an orifice having a filament attenuation disruption to a non-disrupted orifice to reduce the tendency of said molten material to flood said wall.

3. An orificed wall for a feeder for supplying streams of molten inorganic material to be attenuated into filaments comprising:
a substrate having a plurality of orifices therethrough adapted to issue said streams; and
a control layer joined to said substrate, said substrate and control layer being arranged to form reticulated indentations around the orifices wherein at least a portion of the indentations are comprised of a material characterized in that said molten material exhibits a greater tendency to move through the reticulated indentations than over an exterior surface of the wall surrounding the orifices and wherein said indentations are comprised of recesses around said orifices having channels interconnecting said recesses.

4. An orificed wall for a feeder for supplying streams of molten inorganic material to be attenuated into filaments comprising:
a substrate having a plurality of orifices therethrough adapted to issue said streams; and
a control layer joined to said substrate, said substrate and control layer being arranged to form reticulated indentations around the orifices wherein at least a portion of the indentations are comprised of a material characterized in that said molten material exhibits a greater tendency to move through the reticulated indentations than over an exterior surface of the wall surrounding the orifices and wherein said substrate exhibits a first wetting contact angle when associated with the molten material and said control layer exhibits a second wetting contact angle when associated with the molten material, wherein said second contact angle is greater than said first contact angle.

5. The wall of claims 2 or 3 wherein said recesses and/or channels are substantially completely lined with said control layer and said substrate forms landings having exterior surfaces around said recesses and channels.

6. The wall of claim 5 wherein said substrate is a platinum alloy containing rhodium and said control layer is substantially pure platinum or a platinum alloy having less rhodium content than the substrate.

7. The wall of claim 3 wherein said substrate is comprised of platinum or a platinum alloy containing rhodium and wherein said control layer is rhodium or a Platinum alloy having a greater rhodium content than said substrate.

8. The wall of claims 2 or 3 wherein the base of the channels and recesses are a surface of the substrate and the outwardly extending walls of the channels and recesses are surfaces of the control layer.

9. The wall of claim 3 wherein said substrate is a laminate of a first layer and a second layer, said second layer being joined to said control layer, said second layer having a lower rhodium content than said control layer.

10. The wall of claim 9 wherein said first layer is an alloy of platinum and rhodium, and wherein said second layer is substantially pure platinum, and wherein said control layer is rhodium or a platinum alloy containing rhodium.

11. A method of forming glass filaments comprising:
providing a feeder having an orificed wall comprised of a substrate having a plurality of orifices therethrough adapted to issue said streams; and a control layer joined to said substrate; said substrate and control layer being arranged to form reticulated indentations around the orifices wherein at least a portion of the indentations are comprised of a material characterized in that said molten glass exhibits a greater tendency to move through the reticulated indentations than over an exterior surface of the wall surrounding the orifices, wherein said substrate exhibits a first wetting contact angle when associated with the molten glass and said control layer exhibits a second wetting contact angle when associated with the molten glass, wherein said second contact angle is greater than said first contact angle;
issuing streams of molten glass from said orificed wall;
and drawing said streams into filaments.

12. The method of claim 11 wherein said indentations are comprised of recesses around said orifices having channels in communication with said recesses.

* * * * *